United States Patent
Kvisgaard et al.

[11] Patent Number: 5,178,227
[45] Date of Patent: Jan. 12, 1993

[54] WEIGHING SYSTEM, PARTICULARLY A MARITIME WEIGHING SYSTEM

[75] Inventors: Thorkild Kvisgaard, Aabyhoj; John Bomholt, Aarhus N, both of Denmark

[73] Assignee: Scanvagt A/S, Aarhus N., Denmark

[21] Appl. No.: 681,523

[22] PCT Filed: Nov. 13, 1989

[86] PCT No.: PCT/DK89/00268
§ 371 Date: May 10, 1991
§ 102(e) Date: May 10, 1991

[87] PCT Pub. No.: WO90/05285
PCT Pub. Date: May 17, 1990

[30] Foreign Application Priority Data
Nov. 11, 1988 [DK] Denmark ............... 6291/88

[51] Int. Cl.$^5$ .............................. G01G 19/00
[52] U.S. Cl. ........................ 177/145; 177/200
[58] Field of Search .................. 177/200, 145

[56] References Cited
U.S. PATENT DOCUMENTS

| | | | |
|---|---|---|---|
| 3,322,222 | 5/1967 | Baur | 177/200 |
| 4,212,361 | 7/1980 | Stocker | 177/200 |
| 4,396,080 | 8/1983 | Dee | 177/200 X |
| 4,624,331 | 11/1986 | Naito | 177/200 X |
| 5,050,693 | 9/1991 | Wirth et al. | 177/200 |

OTHER PUBLICATIONS

Childress & Mickel, A Motion Compensated Shipboard Precision Balance System, Nov. 1980, Deep-Sea Research vol. 27, No. 11A.

Primary Examiner—George H. Miller, Jr.
Attorney, Agent, or Firm—Antonelli, Terry, Stout & Kraus

[57] ABSTRACT

For obtaining accurate product weighing results in ships it is not sufficient to effect a correction of the weighing results by an accelerometer, which will only roughly compensate for the weighing errors due to the general movements in the sea. Thus correction are also effected for errors from other marked sources of error, so that it is possible to stake on a large-scale rearrangement of the fish industry from land-based to ship-based plants. Thus, corrections are made for errors due to tiltings of the ship and due to the mechanical noise produced by the engine of the ship or by operative implements on the ship. A calibration of the weighing system is carried out regularly by a calibration system which is effective even during movements in the sea. Moreover, the weighing system, which is passed by a weighing belt, is subdivided in three mutually independent weighing units, whereby usable weighing results are obtainable also by occurring weighing noise impacts, even if one of the weighings should be unacceptable.

6 Claims, 1 Drawing Sheet

5,178,227

WEIGHING SYSTEM, PARTICULARLY A MARITIME WEIGHING SYSTEM

FIELD OF THE INVENTION

The present invention relates to a maritime weighing system of wherein a type, the weighing unit and associated weighing cell is supplemented with a quite similar and immediately adjacent weighing unit for a weight body having a known gravity, with the respective weighing cells being connected to a read out unit, in which a weighing result is corrected for errors due to movements of the entire weighing equipment in the direction of the gravity.

BACKGROUND OF THE INVENTION

The supplementary weighing unit will constitute or appear as an accelerometer, which will detect the vertical movements of the ship in such a manner that these movements, which, as well known may be quite violent and disabling for the use of conventional weighing units with weighing cells, will, in principle, be without any influence on the weighing result, because the weighing results will continually be corrected for the disturbing influence from the movements of the ship in the sea.

Admittedly weighings at sea may thus take place with a certain accuracy, which, however, is not particularly high. Guiding coarse weighings may be effected, but not such accurate small portion weighings, which will be required for achieving the highly desirable result that a maritime processing equipment can be usable for producing fish products for retail sale. So far it has been common practice to distinguish sharply between maritime catching and coarse treating equipment at one side and shore based treating and portion packing equipment at the other side, and no doubt this distinguishing whether consciously or unconsciously is due to the fact that at sea it has not been possible to carry out such weighings, which are sufficiently accurate for an economical preparation and marketing of products to the retailing trade.

SUMMARY OF THE INVENTION

On this background the invention departs from the circumstance that industrially it will be possible to achieve an important simplification and improvement in the working up of fish products for retail sale, if the working up and the associated accurate weighing out of the products can take place on the catch ships quickly after the hauling in of the catch. It is an important associated condition, however, that the products for the retail sale can be weighed out with a high accuracy, such that the required minimum weights per product portion will not give rise to any accumulated overweight of a substantial magnitude.

For the invention it is thus extremely decisive that the maritime weighing systems be regarded as precision devices, the weighing errors of which, despite the use of the accelerometers, are sought to be avoided.

These inaccuracies can be divided into two main groups, namely, for one part physical noise problems originating from extreme accelerations and from shakings of the weighing equipment, and for another part electrical stability problems in the weighing systems, e.g. caused by temperature fluctuations in the close surroundings.

These problems are closely interrelated, because it cannot be immediately whether errors occur and still less whether it is one or another error source which is active, and it cannot even be determined whether an electrical error occurs in the product weighing unit or in the accelerometer unit or in both these units. This would be easy to detect in a stationary system, but with a maritime system in the sea there are no fixed references for checkweighings, because in these circumstances the physical noise problems will exist.

In connection with the invention it has been realized that it is mandatory to cope with both of the said sets of problems for accomplishing the desired good result in practice. The electrical errors may well in advance be minimized so as to be very close to zero, but so far only with the use of components that are so costly that the systems will be far too expensive for industrial use. Instead of that, therefore, it is necessary to concentrate on detecting an actually occurring error and arrange for an immediate compensation thereof, e.g. by a change of the voltage on the relevant weighing cell. It will still be true, however, that at sea there is no special criterion for the existence of an error or for the origin of the error.

Nevertheless, according to the invention, it is possible to make sure whether a maritime weighing system, it being a product weighing unit or an accelerometer, will give the correct weighing result "zero", if the weighing unit is completely unloaded, since in that situation it is without any significance whether during a zero-checkweighing the load or rather the entirely missing load is subjected to unknown and perhaps even extreme accelerations, which cannot be compensated for by the accelerometer. On this background, therefore, it is an important measure of the present invention that provisions are made for a temporary total relief of the loadings on the applied weighing cells and the accelerometer, such that it becomes possible hereby to automatically effect an adjustment of the associated electric system to produce the weighing result "zero".

Materially this relief of the weighing cells may be effected by an actuator located in connection with the weighing unit and being operable to actuate means for bringing away the loading means of the weighing cells from the weighing cells themselves, whereby it is also important that the cells themselves are designed in such a manner that their own movable and loadable portion be as light as possible, such that neither this portion will affect the weighing cell noticeably by the occurring movements in the sea. Just hereby it is possible to check whether an unloaded weighing cell will produce a weighing result which is correct in an absolute sense, namely, the result "zero", and it will then be correspondingly possible to adjust the weighing cell voltage until the indicator shows a predetermined reading corresponding to "absolute zero". This reading should not necessarily be equal to "operative zero", by which also a tare load will be involved, but the details here will depend on the manner in which the weighing result is corrected by means of the accelerometer.

Often it will be necessary to effect such an adjustment several times during the day, because normally there will occur temperature fluctuations, which will affect not only the weighing cells, but also the entire associated electric or electronic equipment. Normally it can be assumed that a correct analogue function of the equipment will be ensured, when the adjustment has been effected, no matter in which part or parts of the equipment the "drift" having necessitated the adjustment has occurred.

In principle the adjustment may well be effected fully automatically with relatively short time intervals, as the control equipment may be programmed to locate moments or periods of time, in which there is sufficient time to effect the adjustment, and to actuate suitable means for lifting off the tare load or preload of the weighing cells and to thereafter actuate an adjusting circuit for changing the supply voltage of the respective weighing cells until both cell systems produce the indication "absolute zero". In practice, however, it is much easier to effect the said lifting off by a purely mechanical actuation of the apparatus by a suitable handle.

Thus, by these measures it is possible to currently effect a required calibration of the weighing equipment in spite of occurring movements at sea, but what is left is the considerable inaccuracy which is due to mechanical "weighing noise" caused by the unstable surroundings. If the vessel, with its engine stopped, just pitches up and down on smooth waves these noise problems will be without particular significance, but such an ideal condition is not liable to occur in practice. Normally the weighing system is affected by strong vibrations from the engine and from the collision of the vessel with choppy waves, and in both cases the said weighing noise will occur and give rise to substantial inaccuracies of the weighing results, whether or not the weighing system itself has been newly corrected or calibrated as described.

As already suggested these sources of noise may be subdivided in more categories, which will require individual solutions for the desired final result to be achievable. A high accuracy is not achievable if there remains only a single of several possible inaccuracies. The concerned categories are:

1) Resonance oscillations in the mechanical weighing system by the supply of each new weighing object.
2) Outer 'minor vibrations' in or of the mounting base of the weighing system originating from various mechanical noise on board, e.g. engine vibrations or minor vibrations caused by the impacts of the vessel against low waves.
3) Beat-like influences of more extreme types, e.g. by collision of the vessel with "unlucky waves", whereby any weighing result will be wrong, no matter which precautions are taken.
4) Exterior influences affecting the product weighing system without affecting the accelerometer. These influences are particularly associated with the dominating use of moving belt weighers, as from an industrial point of view it will normally be a condition that the weighing objects are weighed while being moved on a conveyor belt and that the conveying of the objects is effected with a desired high velocity.

Re 1): It is well known even in stationary weighing systems that a weighing object, which is placed more or less abruptly on a scale, will give rise to mechanical oscillations in the system, such that the weight of the object cannot be measured until these oscillations have ceased. The oscillations may be damped by using mechanical dampers, but these can only be partly effective with respect to a desirable rapid damping. It has been suggested long ago that it is possible, instead to use electrical filters for suppressing from the weighing cell signal partly the very low frequencies, which reveal themselves by large amplitudes at the beginning of the weighing cycle, and partly the higher frequencies which occur about the resonance frequency of the weighing system, though the latter frequency itself being dependent on the load. The damping of the low frequencies implies a noticeable delay of the moment, at which the operative reading out of the weighing signal can be started.

With the invention, use is made of a compensation technique, which has the additional advantage of being able to compensate for external noise. There is used a so-called adaptive filtering, by which rapid analyses of the actual transfer function of the weighing cell are carried out, that is detections of the amplitude of the signal for narrow frequency intervals throughout the entire relevant frequency range, also called a Fourier-analysis. Based on this analysis an inverted transfer function is created and added to the actual transfer function of the weighing cell, whereby the resulting signal will ideally be without oscillations other than the raising of the signal to the correct measuring value. This raising takes place rapidly, such that the belt weigher can operate with a high capacity.

Re 2): In maritime systems, in addition to the proper oscillations of the weighing system there will occur signal oscillations as a result of exterior influences on the entire weighing system. The very low frequent influence originating from the vertical movements and the pitching of the vessel at sea will generally be compensated for by use of the accelerometer, but in the vessel many minor vibrations and shakings occur which will affect both the weighing unit and the accelerometer. In the weighing unit or the weighing signal these vibrations will be widely compensated for by the above compensation technique, but the weighing results may well be wrong anyway, viz. when the compensation signal from the accelerometer is distorted due to these vibrations. According to the invention it is on this background important that the adaptive filtering or compensation is carried out not only for the weighing unit, but also for the accelerometer, as by a subtraction of the signals from the two systems the oscillations due to the said minor shakings will then be out-compensated.

The minor shakings, however, may have different effects on the weighing unit and the accelerometer, respectively, and for this reason, according to the invention, it is advantageous to make use of a separate shaking sensor, which is mounted immediately adjacent the weighing system and is connected to this system in such a manner that the sensor signals will compensate for the corresponding signal variations in the weighing system.

Optionally, however, the separate shaking detector may be avoided, if or when the accelerometer is suitably sensitive for detecting the local shakings with high accuracy.

Re 3): Impact influence from the sea or otherwise may briefly affect the weighing system with such a force and complexity that any measuring result will be wrong. It is well known that in a measuring system it is possible to introduce limits for acceptable measuring results and to recirculate the relevant "unlucky" measuring objects, but for one part the inaccurate measuring results will not necessarily be outside the acceptable range, and for another part it is desirable to avoid spending time on many renewed weighings. According to the invention this problem is dealt with by arranging for the weighing system to comprise three weighing units which are mutually independent and arranged in a series, while they may well cooperate with one and the same signal processing unit. These weighing units will weigh each object in rapid sequence, and under normal conditions all three weighing results will be identical. By an occurring external impact a weighing effected in the same moment of time may be erroneous, but normally this will apply only to one of the three weighings, and in the signal processing unit it may then be determined that just that weighing must be incorrect, when the two other weighings result in other, but mutually identical values. It will not happen frequently that impacts occur so rapidly after each other that two of the three weighings will be influenced.

Re 4): With the measures so far described many significant error signals may be eliminated or compensated for, but with the use of belt weighers in maritime systems the results will nevertheless still often be wrong, and in that case nothing has been achieved. In connection with the invention it has been recognized that there exists still a further source of error, namely one associated in a specific manner with the pitching of the vessel in the sea. It will be unimportant whether the vessel assumes a position inclined from the horizontal, because the accelerometer will compensate for that as well as generally for occurring changes of the direction of the weighing pressure relative to the vertical. If the vessel pitches about an axis parallel with the weighing belt this neither will affect the weighing result, but if pitching takes place about an axis crosswise of the belt, then the direction of the movement of the belt will tilt in the vertical plane, namely by a movement composed by a parallel displacement and a pivoting. By this pivoting an object moving on the belt will be forced to change its direction of movement, and all according to the rate at which it takes place such a change will produce a correspondingly changed pressure of the object on the belt. If the belt in front of the object is pivoted downwardly, the object, due to its inertia, will tend to take off from the belt, while for the same reason it will tend to dive into the belt when the latter is pivoted upwardly, and when this happens just when the object is passing the weighing unit, then the weighing result will thus be correspondingly wrong. This error will not be corrected by the accelerometer, which will hardly be affected by a pivoting and will not at all be affected of whether the objects are conveyed at a higher or lower speed.

These errors could be eliminated by a cardanic suspension of the entire weighing and belt system, this, however, probably being unrealistic. Instead, according to the invention, sensor means can be used for a continuous detection of the tilting of the vessel in the direction relevant for the individual belt, yet in such a manner that it is possible to derive an expression for the angular velocity of occurring changes of the tilting, whether such expressions are delivered as measuring results from the sensor means or should be calculated in the signal processor of the weighing equipment. Additionally, the latter should be supplied with information of the current belt velocity, whereafter the discussed "tilt changing errors" can easily be calculated and utilized for current correction of the weighing results.

BRIEF DESCRIPTION OF THE DRAWINGS

In the following the invention is explained in more detail with reference to the accompanying drawing, in which.

DETAILED DESCRIPTION

Figures 1, 2, 3, 4, 5:
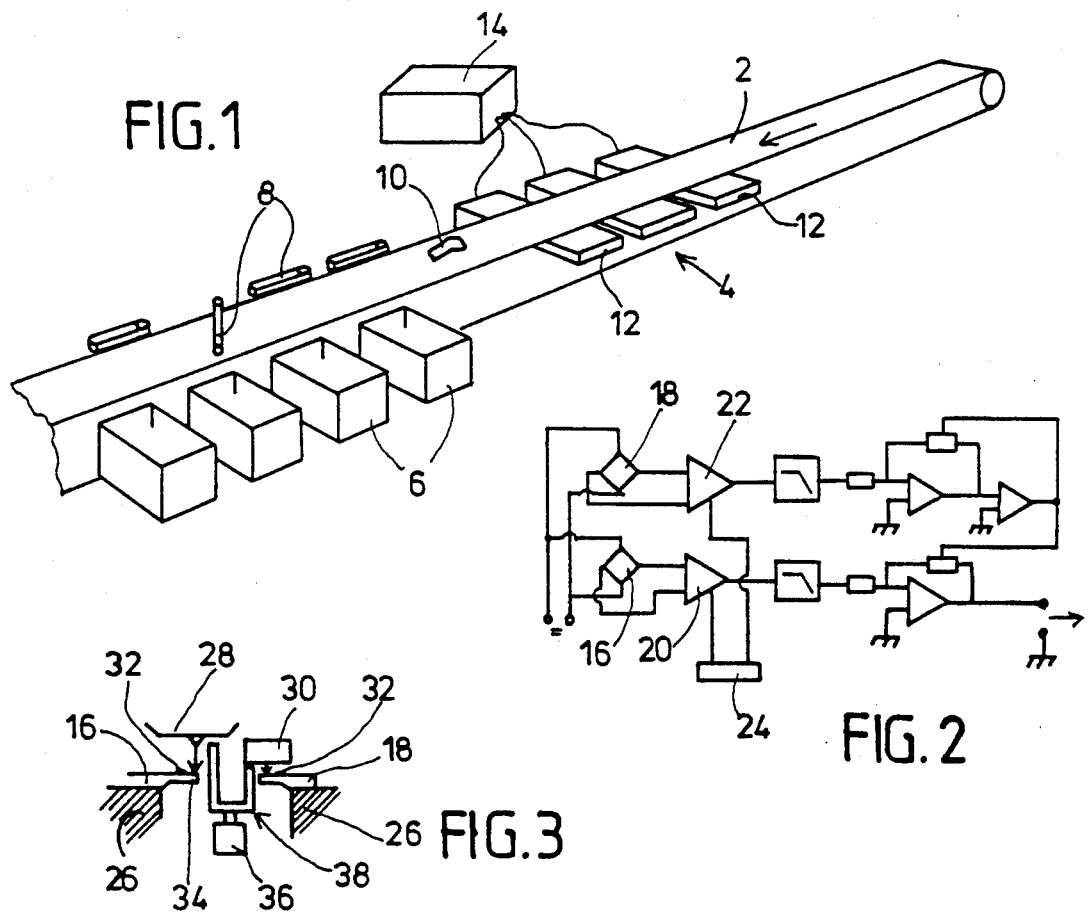
FIG. 1 is a schematic perspective view of a maritime weighing system according to the invention.
FIG. 2 is a schematic diagram of the electrical part of the weighing system.
FIG. 3 is a schematic sectional view of the weighing system.
FIG. 4 is a side view of the weighing system.
FIG. 5 is a graphic illustration of the use of adaptive filters in the weighing system.

As shown in FIG. 1 is shown a weighing and sorting system comprises a conveyor belt 2 which, in the direction indicated by an arrow, passes over a weighing area 4 and further along a stretch, at which a row of collector containers 6 is placed vis-a-vis a corresponding row of diverters 8, which may be actuated to be swung inwardly over the belt 2 and thereby effect a diversion of a conveyed article 10 to a selected container 6 all according to the result of the weighing of the article. So far described the system is fully conventional.

In the weighing area generally designated by the reference numeral 4, mounted beneath the belt 2, are three weighing units 12 relatively close to each other in a longitudinal direction of the belt, and these weighing units 12 are connected with a common weighing data processor 14, which will record the weighing results for each advanced article 10. A maritime system but also certain other systems may as a whole or at least in the weighing area 4 be subjected to impactlike influences, which, despite the additional use of accelerometers in the weighing units 12, may give rise to totally unacceptable weighing results. Instead of separating out the thus non-weighed articles for renewed feeding to the belt 2 it is possible to use the three weighing units based on the consideration that presumably it will only be one of the three weighings which will be disturbed by the influence of the impact or impacts, whereby the data processor 14 can easily sort out the correct result through the two other weighings. It can be an alternative to use only two weighing units 12 in association with a separate sensor for the detection of occurring impact situations, whereby the sensor may condition that only such weighing signals can be accepted which occur outside these situations. There may be used more than three or two weighing units, respectively, and it is a possibility that one or more of the associated accelerometers can be exploited for the detection of the impact situations.

The diagram shown in FIG. 2 is largely self-explanatory. The weighing cell of the weighing unit is designated 16 and the weighing cell of the accelerometer 18, while the associated primary amplifiers are designated 20 and 22, respectively. A control unit 24 is connected with the amplifiers 20, 22 in the manner explained below.

In FIG. 3 is schematically indicated the mechanical part of each of the applied weighing units, comprising a chassis 26, on which is mounted a pair of weighing cells 16 and 18 for a weighing plate 28 and a stationary accelerometer load 30, respectively. The weighing cells are designed in such a manner that their active sensors 32 are located very close to the respective loaded end portions 34 of the cells, such that these end portions are of as small dimensions and weight as possible, which in practice means a very small weight of the end portions. In the unit is also mounted an actuator 36 for raising a carrier portion 38, which has upwardly projecting parts for a concurrent lifting off of the weighing plate 28 and the load 30 from the respective weighing cells 16 and 18.

When such a lifting off or any corresponding removal of the loads on the weighing cells has been accomplished, the weighing cells should produce a weighing result of absolute zero, and it is possible to check this result whether or not the chassis 26 is subjected to movements, as e.g. vertical accelerations or decelerations will only negligibly affect the sensors 32 due to the very small gravity or mass of the end portions 34 of the weighing cells. Hereby it is possible to check at suitable intervals whether the weighing unit is correctly adjusted with respect to the delivery of weighing signals to the processor 14, with the associated check of "absolute zero" being both easier and more representative than a check weighing of a weight master concurrently with the presence of the load 30 on the weighing cell 18 of the accelerometer.

If such a check weighing of "absolute zero" does not give the result zero for both of the weighing cells 16 and 18 by respective separate readings of the cell output signals, then the operator may effect a correspondingly required adjustment of the respective amplifiers 20 and 22 until the read out signals provide the results "zero". This can be done by manually operable adjustment means, and it will be appreciated that, for this adjustment, it will be unimportant what is the deeper reason for the adjustment requirement, i.e. whether the need is due to mechanical circumstances or to a drift in the electrical system.

The control unit 2 shown in FIG. 2 is adapted to carry out the relevant zero adjustments automatically, as by the actuation of the raising device 36, FIG. 3, it is caused to measure the output signal from the associated electrical part of the relevant weighing unit and to thereby adjust the primary amplifiers 20,22 until the output results become "zero". Thereafter, the produced weighing result signals will be correct until the next adjustment, which can be effected e.g. at the beginning of each working day and/or several times during each working period, particularly if during this period so marked temperature changes occur that already these will give rise to considerable changes of the reaction of the mechanical or/and the electrical system of the weighing unit.

In FIG. 4 it is shown that the single weighing units 12 may be connected or provided with separate conveyor belt units 40, and it is also shown that the system may comprise sensors 42 for detecting mechanical noise in the area, of course, preferably, as close as possible to the weighing system. One or more of the sensors 42 may be adapted to detect the tiltings of the vessel in the longitudinal direction of the belt 2, which will normally be the longitudinal direction of the vessel, such that hereby it becomes possible to effect a weight-pertaining compensation for such positive or negative contributions to the weighing results which occur as a consequence of the weighed objects moving over the weighing units in a non-horizontal direction, respectively with a change of direction by an occurring longitudinal tilting of the belt 2 as explained above.

An occurring mechanical noise, e.g. from a vessel engine or from working appliances, will reveal itself in the output signals from the weighing cells 16 and 18 and will to some degree be compensated for by the concurrent influence on the object weighing systems and the associated accelerometers. Such noise may nevertheless give rise to weighing errors, and, as already mentioned, it is important that in accordance with the invention it is possible to use even rather advanced filters for compensating or cleaning of the weighing signals such that these can be trusted to really express the weight of the weighed objects.

Suitably use can hereby be made of different filters, which are adapted to and are actuated in different characteristic situations, e.g. all according to the vessel engine being operating or not, respectively whether it works at high or low speed. Such filters may be material, electronic filters, or their function may be achieved by a data processing of the primary weighing signals, as the associated data processing equipment may be programmed with various relevant correction programs. These programs may then be selected all according to occuring types of noise, and it is here a possibility that such a selection can be effected automatically based on the sensor equipment 42 detecting the type of the noise. It would then be possible even that by such sensing an automatic adaptation of the correction program be effected, such that the accuracy of the weighing signal is steadily maximized, based on current frequency analyses of the signals from the weighing cells.

It should be noted that in the above description it has been presupposed that the weighing signals have been delivered and treated as analogue signals, but of course it will be a natural and even preferred possibility that the signals are constituted by and handled as digitalized signals.

Finally it should be mentioned that with the use of manually operated adjustment means for the supply voltage for the weighing cells or for the associated amplifier equipment it is possible to purely iteratively adjusting the single weighing units to present a constant weighing result despite occurring movements in the sea or other kinds of low frequent movements.

It should be noticed that the invention will also comprise the disclosed methods for improving the accuracy of the weighing in accelerometer reference based weighing systems, and that the invention or the single aspects thereof may also to a wide extent be applied to stationary weighing systems, in which mechanical or electrical noise appears. Some of the aspects of the invention can be advantageous even without the use of the accelerometer.

As far as the said adaptive filtration of noise signals is concerned it is shown in FIG. 5 that in the signal processing unit 14 it is possible to detect the transfer function F(w) and F(a) of the respective weighing and accelerometer equipment, respectively, and that therefrom it is possible to derive inverted transfer functions F'(w) and F'(a), which are added to the respective functions F(w) and F(a), whereafter the signals are filtered through suitable low pass filters F1 and F2 and are finally subtracted from each other, whereby the result will be a clean and rapidly rising weighing signal as shown by V, irrespective of occurring minor shakings of the system. Instead of or in addition to, the accelerometer can be used a special shaking sensor, the output signal of which can be treated in the same manner for outbalancing the oscillations of the weighing signal.

We claim:

1. A weighing system exposed to weighing noise, the weighing system including at least one weighing unit and at least one associated weighing cell, an accelerometer disposed immediately adjacent said at least one weighing unit for a load having a known gravity, a readout unit connected to said associated weighing cell in which weighing results are corrected for errors due to occurring macromovements of the entire weighing system in the direction of gravity, and means for correcting weighing signals for at least one of occurring mechanical noise influence, occurring tilting, and changes of tilting of a conveying path for objects moved over the at least one weighing unit, wherein the associated weighing cell include a load carrier portion and has a small dimension and mass, one of manually and automatically operated actuator means are provided for lifting off from said load carrier portions a load support means for the objects to be weighed and an accelerometer load, respectively, as rested on the load carrier portion, and wherein the system further includes one of manually and automatically operable adjustment means for adjusting a resulting weighing signal into an absolute zero value when said lifting-off is effected.

2. A weighing system according to claim 1, further comprising means for regularly calibrating the system under load-independent conditions.

3. A weighing system exposed to weighing noise, the weighing system including at least three weighing units, each of said weighing units including at least one associated weighing cell and an accelerometer disposed immediately adjacent the respective weighing units for a load having a known gravity, a readout unit connected to the weighing cells in which weighing results are corrected for errors due to occurring macromovements of the entire weighing system in the direction of gravity, and means for correcting weighing signals resulting from at least one of occurring mechanical noise influence, occurring tilting, and changes of tilting of a conveying path for objects moved over the at least three weighing units, wherein the at least three weighing units are located beneath the conveying path, and a recording unit is provided and is adapted to reject obviously erroneous measuring signals, said at least three weighing units are connected with a common registering unit adapted to at least one of accept a weighing result similar for a majority of the respective weighing units or a weighing result which has been detected during an interval of time by a noise detector for a low noise level, and reject weighing results deviating from the results measured by the majority of the weighing units or weighing results which are produced concurrently with the noise detector detecting a high noise level relating to impact noise.

4. A weighing system exposed to weighing noise, the weighing system including at least one weighing unit and at least one associated weighing cell, an accelerometer disposed immediately adjacent said at least one weighing unit for a load having a known gravity, a readout unit connected to the associated weighing cell in which weighing results are corrected for errors due to occurring macromovements of the entire weighing system in the direction of gravity, means for correcting weighing signals for at least one of occurring mechanical noise influence, occurring tilting, and changes of tilting of a conveying path for objects moved over the at least one weighing unit, and means for separating from an occurring weighing signal noise signals which originate from mechanical noise in an area of the at least one weighing unit, wherein the noise separation is effected by at least one of a current adaptive noise compensation and filters for selectively suppressing different characteristic types of noise.

5. A weighing system according to claim 4, wherein the noise separation is effected by one of manual or noise detection controlled selection and adjustment of said filters.

6. A weighing system exposed to weighing noise, the weighing system including at least one weighing unit and at least one associated weighing cell, an accelerometer disposed immediately adjacent said at least one weighing unit for a load having a known gravity, a readout unit connected to the associated weighing cell in which weighing results are corrected for errors due to occurring macromovements of the entire weighing system in the direction of gravity, means for correcting weighing signals for at least one of occurring mechanical noise influence, occurring tilting, and changes of tilting of a conveying path for objects moved over the at least one weighing unit, detector means for detecting at least one of an occurring longitudinal tilting or change of tilting of the conveying path, wherein said detector means is connected to a registering unit for weighing signals through means for correcting errors produced by at least one of the occurring tiltings or the changes of tilting of the conveying path at an actual advancing speed of the objects along the conveying path.

* * * * *